Jan. 14, 1964   C. S. COCKERELL   3,117,643
VEHICLES FOR TRAVELLING OVER LAND AND/OR WATER HAVING
FLUID CURTAINS FORMED BY INJECTOR ACTION
Filed Feb. 5, 1960   4 Sheets-Sheet 1

Inventor
CHRISTOPHER SYDNEY COCKERELL
By Cameron, Kerkam & Sutton
Attorneys

Inventor
CHRISTOPHER SYDNEY COCKERELL

Jan. 14, 1964  C. S. COCKERELL  3,117,643
VEHICLES FOR TRAVELLING OVER LAND AND/OR WATER HAVING
FLUID CURTAINS FORMED BY INJECTOR ACTION
Filed Feb. 5, 1960  4 Sheets-Sheet 3

Inventor
CHRISTOPHER SYDNEY COCKERELL
By Cameron, Kerkam & Sutton
Attorneys

Inventor
CHRISTOPHER SYDNEY COCKERELL

United States Patent Office 3,117,643
Patented Jan. 14, 1964

3,117,643
VEHICLES FOR TRAVELLING OVER LAND AND/
OR WATER HAVING FLUID CURTAINS FORMED
BY INJECTOR ACTION
Christopher Sydney Cockerell, East Cowes, Isle of Wight,
England, assignor to Hovercraft Development Limited,
a British company
Filed Feb. 5, 1960, Ser. No. 6,999
Claims priority, application Great Britain Feb. 13, 1959
5 Claims. (Cl. 180—7)

This invention relates to vehicles for travelling or hovering over land and/or water of the type described in copending application Serial No. 627,925, filed December 12, 1956, and is particularly directed to the provision of improved means for forming the fluid curtains which enclose the pressurised cushions of gas by which such vehicles are supported when in use.

The vehicle disclosed in the aforesaid application comprises means for discharging from the lower part of the body thereof at least one jet of fluid in such a way as to result in the formation and maintenance of a curtain which effectively encloses a space between the underside of the vehicle and the surface over which the vehicle is to operate, so that when the fluid discharge means are in operation a cushion of air or other gas is built up in said space to a pressure sufficient to support or assist in supporting the vehicle clear of the surface, the curtain acting after the manner of the walls of a pneumatic tyre and serving to contain the built-up pressure of the cushion. The fluid discharging means are so arranged and operated that the total thrust produced by the jet or jets of fluid forming the curtain is substantially less than the total weight of the vehicle, a characteristic which renders such vehicles distinct from the more conventional types of vertical take-off craft.

The same system of support is applicable to mobile platforms, and to aircraft and aircraft carriers such as those described in copending applications Serial Nos. 731,338 and 731,474, both filed April 28, 1958, and both now abandoned. The term "vehicle" as used herein is therefore to be understood as including, where the context permits, a mobile platform, an aircraft or an aircraft carrier.

In the vehicles of the aforesaid prior applications, the curtain of fluid has been shown and described as being formed by air or gas discharged from a duct through a continuous annular mouth or port which, if desired, may be provided with vanes for imparting desired components of direction to individual parts of the curtain. This provides a simple system, but it will be appreciated that a comparatively large volume of air or gas at a relatively low pressure is required from the prime mover, and that the velocity of flow through the ducts is correspondingly high, thereby resulting in an appreciable loss of energy. However, in each of applications Serial Nos. 731,338 and 731,474, of which this application is a continuation-in-part, there was described, but not illustrated, a modified arrangement wherein the fluid discharging mouth might consist of a plurality of separate nozzles leading from an endless duct into which the fluid is supplied, the fluid issuing from the nozzles as high speed jets which entrain air and result in a thicker, slower moving curtain than that which would be obtained with high speed air or exhaust gases discharged through a continuous mouth. The present invention is a carrying forward of, and an improvement on, the broad concept originally described in said applications Serial Nos. 731,338 and 731,474.

According to the invention, the cushion containing curtain of fluid is formed and maintained by the entrainment of air by injector action. By this means it is possible to form a curtain of adequate strength with a jet or jets of comparatively high pressure fluid of considerably smaller area than would otherwise be the case. This has the advantage that a smaller volume of fluid has to be moved by the prime mover in order to produce the jet or jets. A further advantage obtained is that the prime mover or prime movers of the vehicle are to some extent decoupled from the effect of the cushion pressure, thus reducing the effect of shock due to a rise in cushion pressure, for example, when the height of the vehicle is reduced other than by a reduction of the flow of the curtain forming gases.

Another advantage of the use of injectors lies in the fact that it is feasible to feed the comparatively low volume jet or jets from a reservoir of relatively slowly moving fluid at a relatively high pressure. If the pressure in the reservoir is maintained by a number of engines, the operation of the jet or jets will be affected only to a minor degree if one of the engines fails.

The injector action can advantageously be obtained by means of a plurality of separate nozzles which are arranged in an annulus around the lower part of the vehicle. These nozzles may open into the atmosphere or into an annular duct which is itself open at the bottom for the discharge of the fluid forming the curtain and is also open at or near the top to the atmosphere. Alternatively, a single annular jet may be used, this jet being of smaller width than would be required if the curtain were to be formed without entrainment of air. If a single annular jet is used, it is necessary in order to enable the entrainment of air to take place either to provide a duct into which the jet opens or to provide slots in the wall of the duct through which atmospheric air may be inducted.

If a slotted duct is used, the annular configuration of the duct requires that the slots shall be on one side only, that is, the outer side of the duct. This results in an uneven pressure distribution radially across the curtain, but the distribution is such as to be advantageous since the lowest pressure is on the outside of the curtain and the highest pressure on the inside, which distribution leads to the greatest efficiency.

The air to be entrained by injector action may be guided into the jet system from a position of relatively high pressure formed by the motion of the vehicle. Thus, where a number of separate nozzles surrounded by a duct are used, the upper rim of the duct may be so formed that the intake of the duct both at the front and the back of the vehicle faces, so far as possible, towards the front.

If a plurality of nozzles open into a duct which is curved in cross-section at a point before mixing of the high velocity fluid and the entrained air is completed, guide vanes or baffles should be provided within the duct to maintain the stream lines of the flow as far as possible and prevent turbulence.

For convenience, it will be assumed hereinafter that, unless otherwise stated, the fluid supplied to the injectors is air, although it could be another fluid, such as engine exhaust gases or a mixture thereof with air, or alternatively steam or sprayed water.

For a better understanding of the invention, and to show how the same may be carried into effect, reference will now be made to the accompanying drawings wherein like reference characters indicate like parts throughout the several views and in which.

Figure 2:
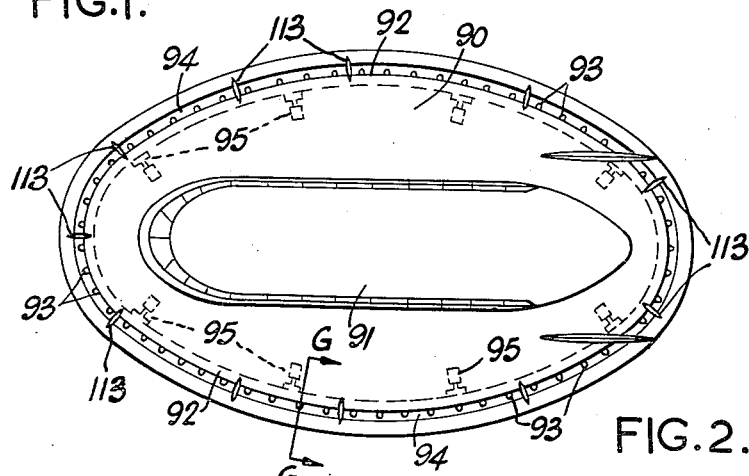
FIGURE 2 is a plan view of the vehicle illustrated in FIGURE 1.
Figure 8:
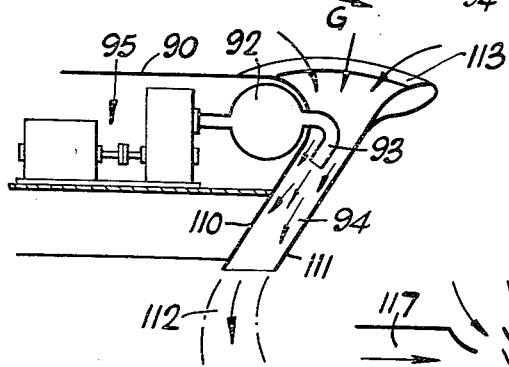
Figure 9:
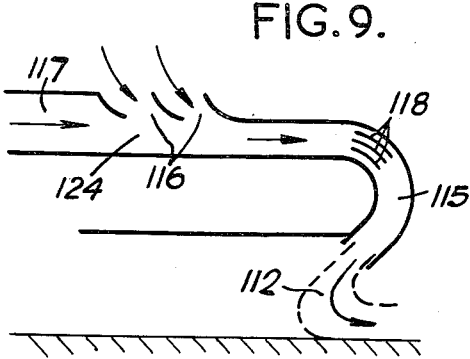
Figure 3:
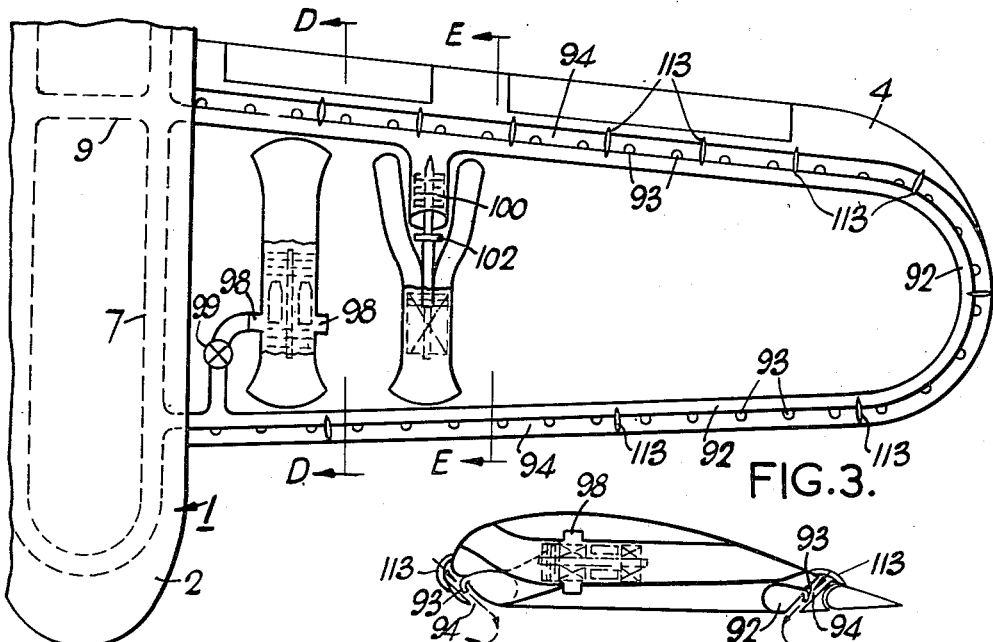
Figure 4:
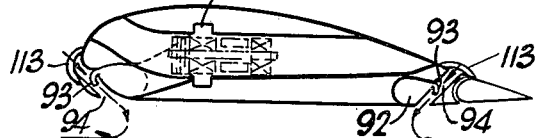
Figure 5:
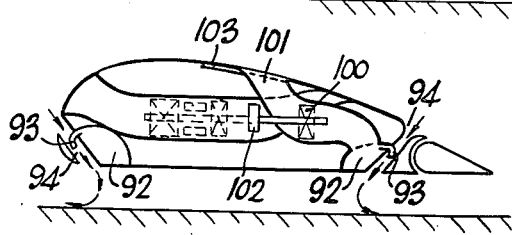
Figure 7:
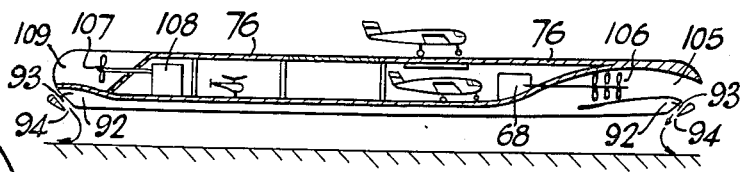
Figure 6:
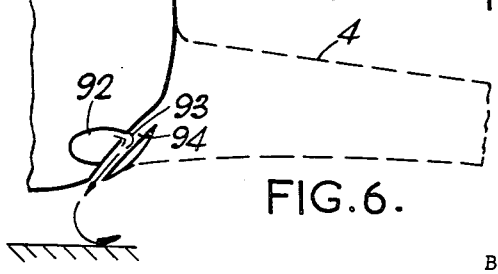
Figure 10:
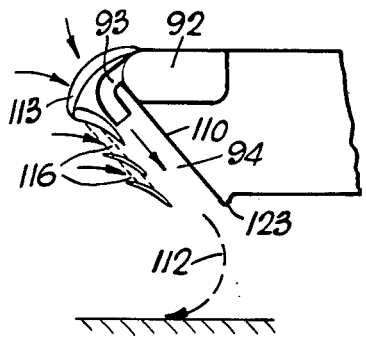
Figure 11:
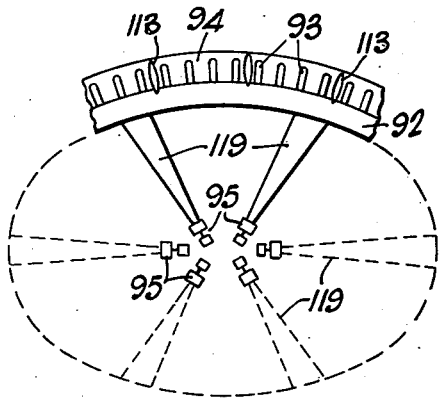
Figure 12:
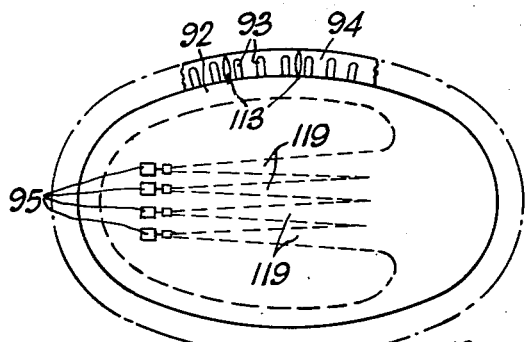
Figure 13:
Figure 14:
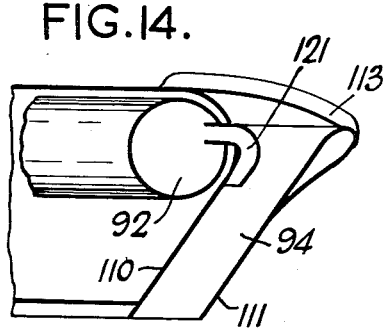
Figure 15:
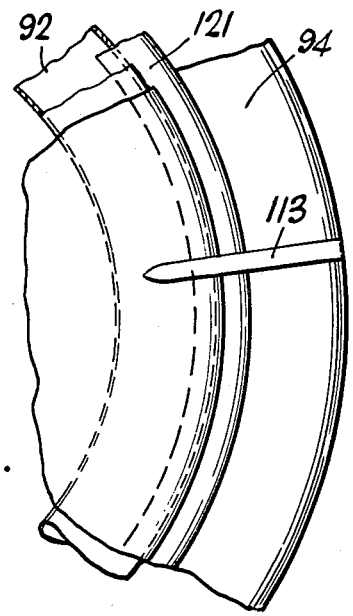
Figure 16:
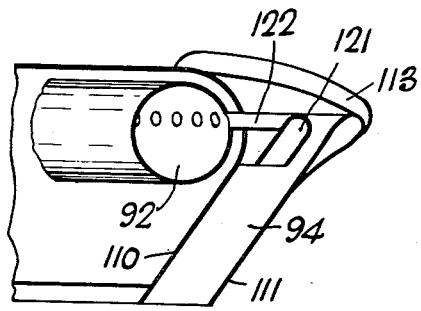
Figure 17:
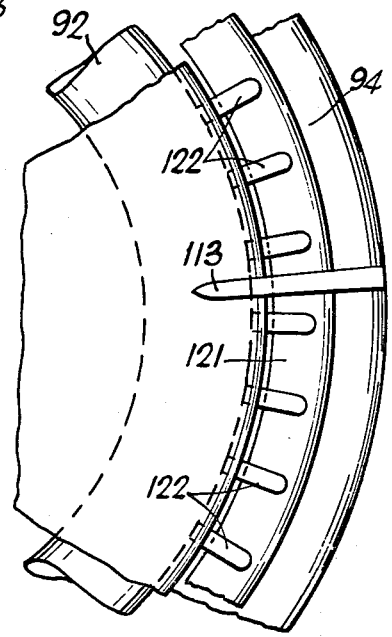

FIGURE 3 is a diagrammatic part sectional plan view illustrating a further embodiment of the invention as applied to an aircraft, FIGURE 4 is a diagramatic cross section on the line D—D of FIGURE 3, FIGURE 5 is a diagrammatic cross section on the line E—E of FIGURE 3, FIGURE 6 is a partial cross section of an aircraft body illustrating the application of a feature of the invention, FIGURE 7 is a diagrammatic cross section of an aircraft carrier illustrating a further embodiment of the invention, FIGURE 8 is a diagrammatic cross section on an enlarged scale on the line G—G of FIGURE 2, FIGURES 9 and 10 are views similar to FIGURE 8 illustrating alternative forms of the invention, FIGURES 11, 12 and 13 are diagrammatic partial plan views illustrating further ways of applying the embodiments of the invention illustrated in FIGURES 3 and 7, FIGURE 14 is a further view similar to FIGURE 8 illustrating yet another form of the invention, FIGURE 15 is a partial plan view of the embodiment of FIGURE 14, FIGURE 16 is a view similar to FIGURE 14 illustrating an alternative form of construction, and FIGURE 17 is a partial plan view of the embodiment of FIGURE 16.

Figure 1:
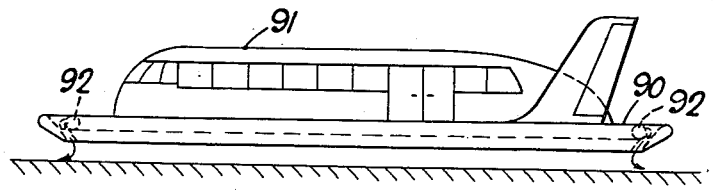
FIGURE 1 is a side elevation of a vehicle embodying the invention.

Referring now to FIGURES 1 and 2, there is shown therein one embodiment of injector means for forming and maintaining a fluid curtain in accordance with the present invention which, for convenience, is shown as applied to a vehicle having a body comprising a base portion 90 of approximately elliptical plan form and a central portion 91 mounted on the base portion. The base portion 90 contains a ring main 92 positioned adjacent the periphery thereof which is connected to a series of injector nozzles 93 opening into a duct 94. The construction and positioning of the ring main 92, nozzles 93 and duct 94 will be more readily seen in FIGURE 8 which is described below. Air or other gases may be supplied to the ring main 92 by any suitable means, such as a series of individual pumps 95 as shown in FIGURE 2.

FIGURES 3, 4 and 5 show the application of injectors embodying the invention to the wing 4 of an aircraft 1 which is similar in other respects to that described and illustrated in the aforesaid prior application Serial No. 731,474. In this embodiment, high pressure air for the injectors 93 may be obtained by tapping air from the compressor for the inboard engine as shown at 98, a suitable valve 99 being provided for shutting off the supply of air when not required. An alternative method of supplying the high pressure air is the provision of a further separate compressor driven by each engine, as shown at 100 for the outboard engine. This further compressor may have its own intake 101 in the top of the wing, the air from the compressor passing into the ring main 92 and thence to the injectors 93. The compressor 100 may be driven by the engine through a clutch 102 by means of which it can be disengaged from the engine when the injectors are not in use. A sliding flap 103 may be provided to close the intake 101. In such an aircraft, half of the engines, for example, would supply the high pressure air for the injectors, while the remaining engines would supply the curtain forming air for the curtains beneath the body or fuselage 2 of the aircraft which issue from ports (not shown) formed in the bottoms of ducts 7 and 9, the latter being connected to ring main 92. Alternatively, the air for the curtains beneath the body could be provided by auxiliary engines.

FIGURE 6 illustrates diagrammatically one way in which injectors could be applied to the body 2 of the aircraft shown in FIGURE 3, if desired. However, in places where the duct 94 could not be provided, each as under the junction of wing 4 and fuselage 2, provision must be made for forming a normal type of curtain in the manner disclosed in the aforesaid application Serial No. 731,474. Air for such a curtain can be obtained from the same source as that for the injectors, the air being reduced in pressure and increased in velocity in any suitable manner before being fed to the curtain forming port.

FIGURE 7 illustrates the application of the injector system of the present invention to an aircraft carrier similar to that disclosed in the aforesaid prior application Serial No. 731,338. In this embodiment, air entering the intake 105 is compressed by the compressors 106 which are driven by engines 68 and is then fed to the ring main 92. From the ring main 92 the compressed air is fed to the injectors 93 and by injector action induces atmospheric air through the duct 94 which is formed around the periphery of the carrier. The compressors 106 are of a type suitable for compressing the air to a higher pressure than is the case in the carrier illustrated in said prior application. For example, a number of multi-stage axial flow compressors could be provided across the width of the intake 105. Further curtains in addition to that issuing from duct 94, to provide stability, may be formed in a manner similar to that disclosed in application Serial No. 731,338 by arranging for some of the compressors 106 to supply air at a lower pressure and with a greater velocity to the curtain forming ports. Propulsion of the carrier illustrated in FIGURE 7 is provided by propellers 107, at the rear of the carrier, driven by propulsion engines 108. To keep access to the deck 76 clear for the approach of landing aircraft, the propellers are positioned beneath the level of the deck in a channel formed by side members 109. Alternatively, the carrier may be propelled in the same manner as that disclosed in application Serial No. 731,338, the compressors which supply air for the stability curtains also providing propulsion air which is expelled through a nozzle or nozzles in the rear of the carrier.

Turning now to the operation of the injectors, FIGURE 8 illustrates particularly the system shown in FIGURES 1 and 2, but is, in action, the same for FIGURES 3 to 7, the only difference being that in FIGURE 2 the ring main 92 is shown as being supplied by a series of individual compressors 95 while in FIGURES 3 to 7 the ring main is supplied from a central source or sources.

As shown in FIGURE 8, the nozzles 93 connect with the ring main 92 and open into a duct 94 which is constituted by a wall 110 forming part of the base portion 90 of the vehicle and a frustoconical member 111 which is spaced from and parallel to the wall 110. The duct 94 is open at the top to the atmosphere and is open at the bottom for the discharge of the mixture of injector nozzle air and entrained air which forms the curtain 112. It will be seen that, by using a ring main of a size of cross section considerably greater than any one of the nozzles, the flow of air as far as each nozzle will be of relatively low velocity, thus reducing losses, and moreover the advantage mentioned above, of maintenance of air flow through the nozzles even if one of several engines fails, is secured. It is, of course, necessary to provide some means of attaching the frustoconical member 111 to the main structure of the vehicle. A convenient method of doing this is by means of struts 113 attached at one end to base portion 90 and at the other end to the member 111. If these struts are suitably streamlined, the interference with the flow of induced air into the duct 94 will be very little.

An alternative method of obtaining the injector action of the present invention is illustrated in FIGURE 9. As there shown, a continuous annular duct 115 is provided around the periphery of the base portion 90 of the vehicle as previously described and the injector action is secured by means of slots 116 in the outer wall of the duct through which atmospheric air may be induced. In this embodiment, the ring main 117 is inboard of the injector or induction slots 116 and the air supplied to the ring main and the injector 124, which is formed by the restricted throat between the walls of the slots 116 and the inner wall of duct 115 which is a continuation of the bottom wall of the ring main 117, is of higher pressure and lower volume than that required to form the curtain. The curtain forming jet is thus constituted by the mixture of high pressure air supplied from the ring main 117 and the air entrained or inducted through the slots 116 by the injector action resulting from the flow of the high pressure air through the restrictions formed by the walls of the injector slots 116. The high pressure air may be supplied to the ring main in any suitable manner, as by the means illustrated in either FIGS. 3–7 or FIG. 8, above described. The formation of a curtain in this manner results in a pressure distribution such that the lowest pressure is at the outside of the curtain and the highest pressure is at the inside. By this means, a thicker curtain can be obtained for the same expenditure of power, with the further advantage of decreasing the radius of curvature of the inside layer of air, for a portion of its travel, thus increasing the pressure which can be sustained by the curtain. Guide vanes 118 may be provided at the curved part of the duct 115 to maintain this distribution and reduce turbulence.

FIGURE 10 illustrates a multi-stage injector system which combines the separate nozzles 93 of FIGURE 8 and the slots 116 of FIGURE 9.

To obtain the maximum efficiency of the injector system for forming air curtains, as much use as possible should be made of the pressures occurring due to the movement of the vehicle. For example, as shown applied to an aircraft in FIGURES 3, 4 and 5, the inlet of the duct 94 along the leading edge of the wing should be so positioned as to take advantage of ram pressure due to the forward motion of the aircraft. Similarly in the aircraft carrier of FIGURE 7, the portion of the duct 94 along the front of the carrier can be arranged to take advantage of this effect. Various other ways of taking advantage of any head or ram pressure due to the motion of the vehicle can readily be applied.

FIGURES 11, 12 and 13 show alternative arrangements for supplying the ring main 92 with pressurised air, which would be particularly applicable to aircraft carriers and to large aircraft. In FIGURE 11 the compressors 95 feed the air to ring main 92 through divergent ducts 119 wherein the velocity of the air is reduced and the pressure increased as it travels towards the ring main. This enables a simpler type of compressor to be used.

FIGURE 12 shows a modification of the arrangement of FIGURE 11 which may have structural advantages in certain circumstances.

In the arrangement of FIGURE 13, the multi-stage injector action is obtained by providing slots 114 in the ducts 119. By this means, with or without the multi-stage arrangement of FIGURE 10, a sufficient entrainment of air may be obtained to dispense with a compressor altogether, the motive power being obtained solely by the exhaust of a jet or gas turbine engine 120.

In the examples so far described, with the exception of that shown in FIGURE 9, the high pressure air is introduced by means of separate injectors. However, the air can just as readily be introduced by means of an injector or series of injectors in the form of annular or part annular nozzles.

FIGURE 14 is a cross section, similar to that of FIGURE 8, showing one form of annular injector nozzle 121. If the injector nozzle is in continuous connection with the ring main 92, as seen in FIGURE 15, air will not be able to get between the nozzle and the inner wall 110 of duct 94, in which case the nozzle is arranged to be adjacent to the inner wall, as shown. If, however, the annular nozzle 121 is fed by a series of separate pipes 122 from the ring main 92, as in FIGURES 16 and 17, then the nozzle can be situated in the centre of the duct as air can pass between the pipes 122 and flow between the nozzle 121 and the inner wall 110 of the duct 94.

In all the examples shown and described, care should be taken to see that the edge defining the inner side of the mouth or port at the bottom of duct 94 is sharp and not rounded. This is particularly shown at 123 in FIGURE 10, and insures that the curtain 112 does not cling to and follow the underside of the vehicle, but breaks cleanly away from the mouth and follows the path shown in broken lines.

Any of the injector systems described herein may be applied to vehicles such as those disclosed in copending application Serial No. 809,699, filed April 29, 1959, in which the fluid forming the curtain is recirculated. In such cases, the injector action may be utilised to form and maintain any or all of the several concentric curtains. In the case of a vortex curtain, the entrained air is derived from the pressurised cushion within the curtain, while in certain of the other arrangements described in said application Serial No. 809,699 the entrained air is derived partly from within the pressurised cushion and partly from the atmosphere.

What is claimed is:

1. In a vehicle of the type described adapted to hover or travel over a surface at a predetermined height which is small in relation to the size of said vehicle and comprising a body and wherein a curtain of moving fluid issues from the lower part of the vehicle body and travels across the gap existing between said body and said surface, which curtain in combination with said body and said surface effectively encloses a gas containing space between the bottom of said vehicle and said surface wherein a cushion of gas under pressure is formed, the improvement which consists in the provision of an annular duct extending around the periphery of the lower part of the vehicle body, said duct having a discharge mouth at the bottom end thereof adjacent the bottom of the vehicle and induction slots in the outer wall thereof open to the atmosphere, injector nozzle means opening into said duct, and means within the body of the vehicle for supplying fluid to said nozzle means, whereby air may be entrained from the atmosphere through said slots into said duct and mixed therein with the injected fluid to form a curtain consisting primarily of entrained air energised by injector action.

2. In a vehicle of the type described adapted to hover or travel over a surface at a predetermined height which is small in relation to the size of said vehicle and comprising a body and wherein a curtain of moving fluid issues from the lower part of the vehicle body and travels across the gap existing between said body and said surface, which curtain in combination with said body and said surface effectively encloses a gas containing space between the bottom of said vehicle and said surface wherein a cushion of gas under pressure is formed, the improvement which consists in the provision of an annular duct extending continuously around the periphery of the lower part of the vehicle body, said duct having a discharge mouth at the bottom end thereof adjacent the bottom of the vehicle, a ring main within the body of the vehicle adjacent the periphery thereof and communicating with the upper end of said duct, means for supplying fluid under pressure to said ring main, and means forming induction slots in the outer wall of said duct adjacent the upper end thereof, said induction slot forming means being so constructed and arranged as to restrict the flow of fluid from said ring main into said duct, whereby air may be entrained from the atmosphere through said slots into said duct and mixed therein with the fluid flowing from said ring main into said duct to form a curtain consisting primarily of entrained air energised by injector action.

3. In a vehicle of the type described adapted to hover or travel over a surface at a predetermined height which is small in relation to the size of said vehicle and wherein a fluid is caused to issue from the lower part of the vehicle body and form a curtain of moving fluid travelling across the gap existing between said body and said surface, which curtain in combination with said body and said surface effectively encloses a gas containing space between the bottom of said vehicle and said surface wherein a cushion of gas under pressure is formed, the improvement which consists in the provision of means cooperating with the periphery of the lower part of the vehicle body to form an annular duct having a discharge mouth at the bottom end thereof adjacent the bottom of the vehicle and an upper portion which is open to the atmosphere, a source of high pressure fluid carried by the vehicle, and means for injecting fluid from said source into said duct, said injecting means including jet nozzle means positioned around the periphery of the vehicle and opening into said duct, and means for supplying injector fluid from said source to said jet nozzle means, whereby air may be entrained from the atmosphere into said duct and mixed therein with said injected fluid to form a curtain consisting primarily of entrained air energised by injector action.

4. A vehicle as claimed in claim 3 wherein said jet nozzle means comprises a plurality of jet nozzles arranged in an annulus adjacent the upper end of said duct and so disposed as to discharge fluid downwardly into said duct.

5. A vehicle as claimed in claim 3 wherein said jet nozzle means comprises an annular jet nozzle positioned in said duct adjacent the upper end thereof and so disposed as to discharge fluid downwardly into said duct.

References Cited in the file of this patent

UNITED STATES PATENTS

| | | |
|---|---|---|
| 1,873,505 | Stipa | Aug. 23, 1932 |
| 1,954,437 | Washburne | Apr. 10, 1934 |
| 2,444,318 | Warner | June 29, 1948 |
| 2,922,277 | Bertin | Jan. 26, 1960 |

FOREIGN PATENTS

| | | |
|---|---|---|
| 219,133 | Australia | Nov. 24, 1958 |